No. 811,232. PATENTED JAN. 30, 1906.
J. LANG & A. FISCHER.
VEHICLE TIRE.
APPLICATION FILED NOV. 14, 1904. RENEWED JUNE 28, 1905.
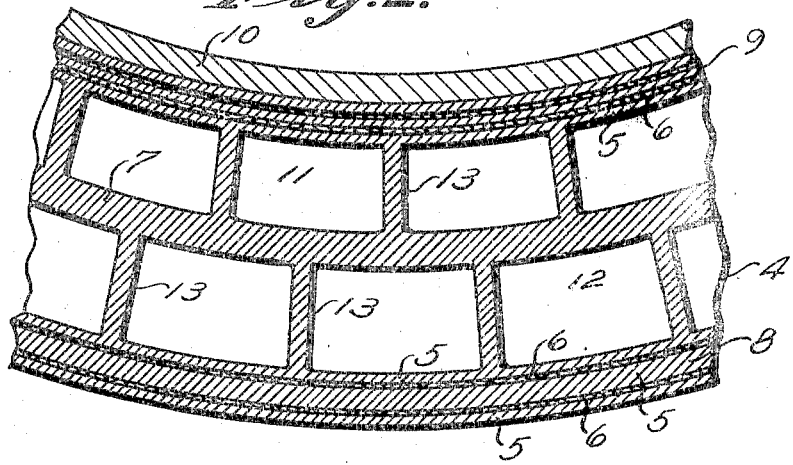
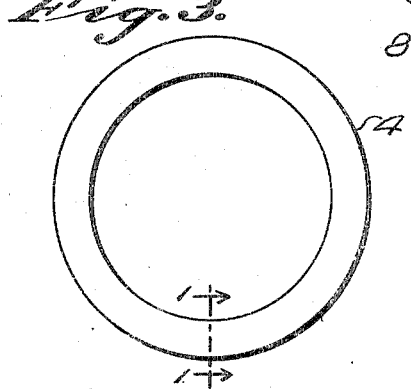
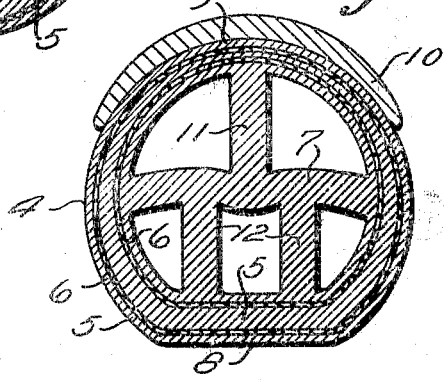

UNITED STATES PATENT OFFICE.

JULES LANG AND AUGUST FISCHER, OF CHICAGO, ILLINOIS.

VEHICLE-TIRE.

No. 811,232.

Specification of Letters Patent.

Patented Jan. 30, 1906.

Application filed November 14, 1904. Renewed June 28, 1905. Serial No. 267,451.

*To all whom it may concern:*

Be it known that we, JULES LANG, a citizen of France, and AUGUST FISCHER, a citizen of the United States of America, residents of Chicago, in the county of Cook and State of Illinois, have invented certain new and useful Improvements in Vehicle-Tires, of which the following is a specification.

The main object of this invention is to provide an improved form of resilient hollow cushion-tire particularly adapted for heavy vehicles and of such structure as to be unaffected in its resilience by punctures of its tread-surface. We accomplish this object by the device shown in the accompanying drawings, in which—

Figure 1 is a transverse section of a vehicle-tire constructed according to our invention. Fig. 2 is a fragmentary longitudinal section of the same on the line 2 2 of Fig. 1. Fig. 3 is a side elevation of the complete tire on a reduced scale. Fig. 4 is a transverse section of the same tire, showing the approximate effect of load on the same.

In the construction shown in the drawings, the tire consists of an endless tube 4, having its outer walls constructed of alternate layers of rubber 5 and canvas 6. The wall of the tube at 8 along the tread-surface of the tire is of considerably greater thickness than the opposite wall 9, which engages the rim 10 of the wheel. Only the simplest form of wheel-rim and rim-surface of the tire is shown, as the main feature of this invention is the internal structure of the tire.

The hollow interior of the tire is subdivided into two principal divisions by means of the annular partition 7, which extends longitudinally of the tube and transversely of the plane of the wheel. The wall of the tube on the rim side of the tire is supported by a central annular web 11, extending between the partition 7 and said wall at right angles to the partition or in the plane of the wheel. The wall of the tube which forms the tread of the wheel is supported by two annular webs 12, which lie in parallel relation with the plane of the wheel and extend between the partition 7 and the wall 8 of the tube. The webs 12 meet the partition 7 along lines lying intermediately between the web 11 and the sides of the tube. The annular spaces inclosed and separated from each other by the said partition, webs, and the walls of the tube are preferably again subdivided by radially-disposed webs 13 to give the tire a cellular structure. As in the case of the longitudinal webs, the radial webs 13, which lie between the partition 7 and the tread of the wall, meet the partition 7 at points intermediate of the webs 13, which lie between the partition 7 and the rim-surface of the tire. The radial webs 13 are preferably of considerably less thickness than the longitudinal webs, as the former are intended more to form subdivisions of the air-spaces than to support the tread of the tire. All of the webs and partitions are preferably of rubber or similar resilient material.

In the operation of the device shown it will be understood that the resilience of this form of tire is largely due to the yielding of the resilient partition 7 under the action of the staggered resilient supporting-webs 11 and 12 and is also assisted by the air confined in the inclosed spaces. In case the tire is punctured the effect of the puncture is confined to a limited space on account of the subdividing webs, and the support given to the tire by the supporting-webs is so much greater than the support which is afforded by the confined air that punctures will have but little effect on a tire of this construction.

It will be seen that some of the details of the construction shown may be altered without departing from the spirit of our invention.

What we claim as our invention, and desire to secure by Letters Patent, is—

1. A vehicle-tire, comprising a tube of resilient material a longitudinal partition subdividing the interior of said tube, and a plurality of longitudinal webs on each side of said partition and extending across the space between said partition and the opposite walls of said tube, the webs on one side of said partition lying in different planes from those on the other side, substantially as described.

2. A vehicle-tire comprising an endless tube of resilient material, an annular partition subdividing the interior of said tube and disposed transversely of the plane of the wheel, and a plurality of annular webs lying substantially parallel to the plane of the wheel and extending between said partition and the opposite walls of the tube, the webs on opposite sides of said partition lying in different planes and meeting the partition at different points, substantially as described.

3. A vehicle-tire, comprising a tube of resilient material, a longitudinal partition subdividing the interior of said tube, and a plurality of transverse webs on each side of said partition and extending across the space between said partitions and the opposite walls of said tube, the webs on one side of said partition lying in different planes from those on the other side, substantially as described.

4. A vehicle-tire comprising a tube of resilient material, a longitudinal partition subdividing the interior of said tube, and a plurality of supports extending between said partition and the opposite walls of said tube, the supports on the opposite sides of said partition being arranged to meet the partition at non-coincident points, substantially as described.

5. A vehicle-tire comprising a tube of resilient material, a longitudinal resilient partition extending across the interior of said tube, a longitudinal web extending transversely of said partition between the same and the walls of the tube on one side of the partition, and a plurality of supports extending transversely between said partition and the wall of the tube on the other side of said partition, said supports meeting the partition at points intermediate of said web and the longitudinal edges of the partitions, substantially as described.

6. A vehicle-tire, comprising a tube of resilient material, a longitudinal resilient partition extending across the interior of said tube, a plurality of longitudinal webs extending transversely of the partition between the same and the wall of the tube at one side of said partition, and supporting means on the other side of said partition extending between the same and the opposite wall of the tube, said supporting means meeting the partition intermediately of said webs and being of considerably less thickness than the space between the adjacent parts of said webs, substantially as described.

7. A vehicle-tire comprising an endless tube of resilient material, an annular partition subdividing the interior of said tube and disposed transversely of the plane of the wheel, a plurality of annular webs lying substantially parallel to the plane of the wheel and extending between said partition and the opposite walls of the tube, the webs on opposite sides of said partition lying in different planes and meeting the partition at different points, and a plurality of webs extending transversely across the spaces between said partition and annular webs, all of said webs being of resilient material, substantially as described.

8. A vehicle-tire comprising an endless tube of resilient material, an annular partition subdividing the interior of said tube and disposed transversely of the plane of the wheel, a plurality of annular webs lying substantially parallel to the plane of the wheel and extending between said partition and the opposite walls of the tube, the webs on opposite sides of said partition lying in different planes and meeting the partition at different points, and a plurality of webs extending transversely across the spaces between said partition and annular webs, said transverse webs being of considerably less thickness than the annular webs and all of said webs being of resilient material substantially as described.

Signed at Chicago this 11th day of November, 1904.

JULES LANG.
AUGUST FISCHER.

Witnesses:
E. A. RUMMLER,
GLEN C. STEPHENS.